Jan. 4, 1949.  C. I. MacNEIL  2,458,398
ENGINE SPEED CONTROL
Filed Dec. 8, 1943   2 Sheets-Sheet 1

INVENTOR.
CHARLES I. MACNEIL
BY Herbert L. Davis, Jr.
ATTORNEY.

Jan. 4, 1949.  C. I. MacNEIL  2,458,398
ENGINE SPEED CONTROL
Filed Dec. 6, 1943  2 Sheets-Sheet 2

INVENTOR.
CHARLES I. MacNEIL.
BY Herbert L. Davis, Jr.
ATTORNEY.

Patented Jan. 4, 1949

2,458,398

UNITED STATES PATENT OFFICE 2,458,398

ENGINE SPEED CONTROL

Charles I. MacNeil, Glen Ridge, N. J., assignor to Bendix Aviation Corporation, Teterboro, N. J., a corporation of Delaware Application December 8, 1943, Serial No. 513,419

1 Claim. (Cl. 264—3)

1

This invention relates to internal combustion engines and particularly to the control of the speed of a group of such engines and is a continuation in part of my copending application, Serial No. 417,403, filed October 31, 1941, now Pat no. 2,342,057, and of the joint application, now abandoned, Serial No. 416,578, filed October 25, 1941, by myself and Donald M. Berges as to all matter common thereto.

An object of the present invention is to provide novel means by which all engines of a group may be accelerated or decelerated simultaneously, each to the degree required for synchronism.

A further object resides in the provision of means for applying a correction to the speed of any power plant that is out of synchronism with a master control or reference speed device.

Another object of the invention is to provide means for applying a correction to the speed of any power plant that is out of synchronism with a master control or reference speed device and manually operable means within the cabin of the plane for controlling said power plant independently of said master control.

Another object of the invention is to provide motor means responsive to a constant speed generator and an aircraft engine driven variable speed generator for controlling the pitch of the aircraft propellers driven by said engines in accordance with the magnitude and direction of speed differences between the constant speed generator and the respective aircraft engine driven variable speed generators.

Another object of the invention is to provide novel manually operable means for electrically controlling the operation of a propeller pitch control motor responsive to aircraft engine speed, whereby the pitch of such propeller may be increased or decreased automatically in response to engine speed or independently of the speed of said aircraft engine.

Another object of the invention is to provide novel automatic control means for regulating the pitch of an aircraft propeller in response to engine speed, together with a master control for applying a correction to the pitch of the propeller for maintaining the speed of the engine in synchronism with said master control, and manually operable means for independently varying the pitch of the propeller.

Another object of the invention is to provide a synchronous motor having a stator and rotor winding, one of said windings energized by a master control generator, and the other of said windings energized by a generator driven by the engine to be controlled, so as to maintain said engine in synchronism with said master control, and means for controlling one or the other of said windings so as to effect an independent adjustment of said engine.

Another object of the invention is to provide a novel aircraft engine control, including a first master control, a second control responsive to aircraft engine speed, and means driven by said first and second controls for maintaining said aircraft engine in synchronism with said master control, and means for terminating the action of one of said controls, whereby said engine speed may be independently adjusted by said other control.

Other objects and advantages of this invention are set forth in the following description, taken with the accompanying drawing; and the novel features thereof are pointed out in the appended claim. The disclosure, however, is illustrative only and changes may be made in detail, especially in matters of shape, size and arrangement of parts within the principle of the invention, to the full extent indicated by the meanings of the terms in which the appended claim is expressed.

In the drawings, wherein like reference characters refer to like parts in the several views.

Figure 2:
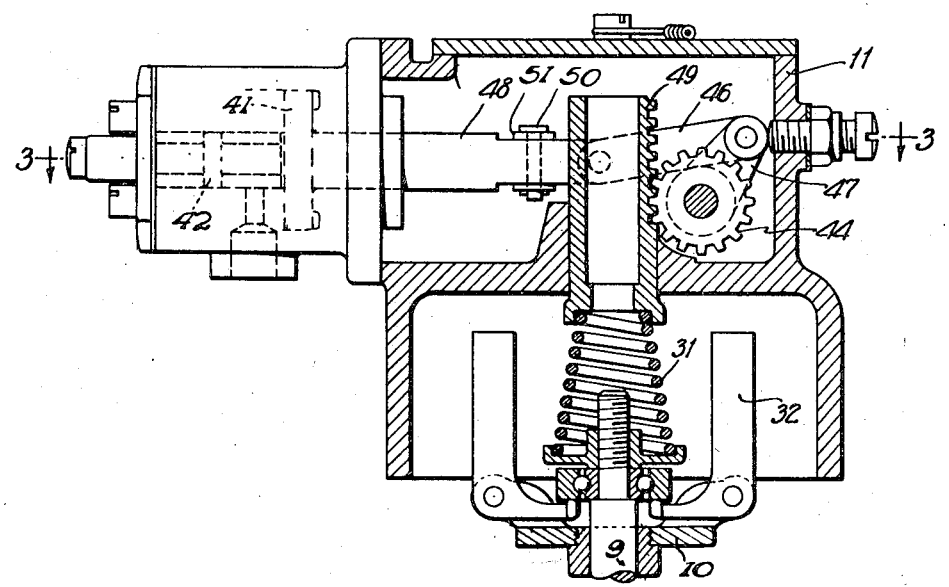
Figure 2 is a sectional view of one of the servo-units.
Figure 3:
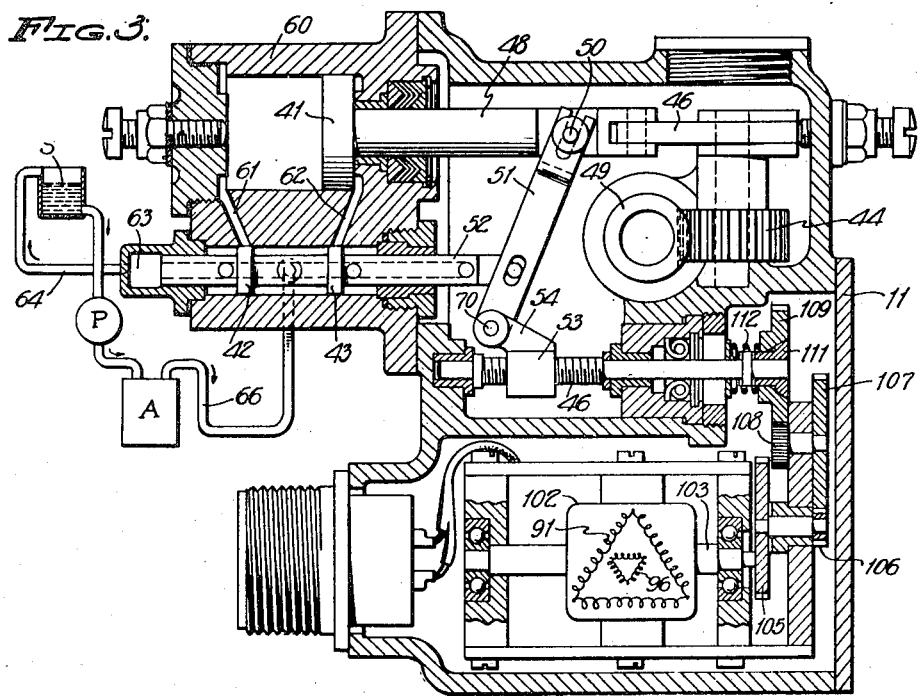
Figure 4:
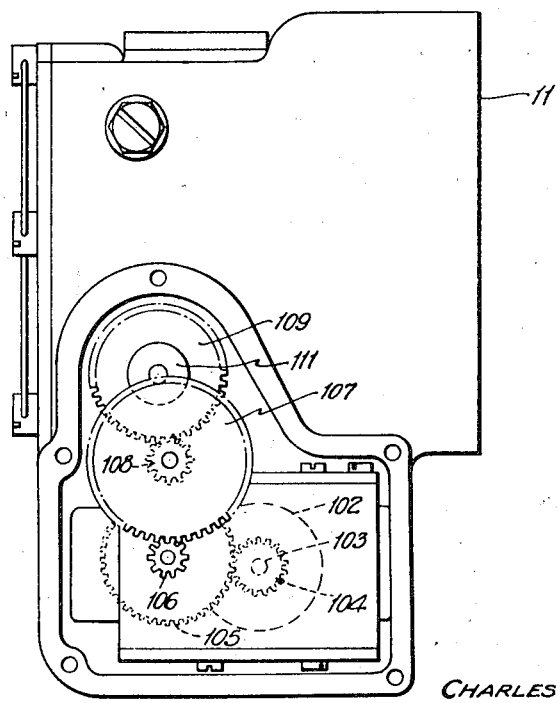

Figure 3 combines the hydraulic connections with another sectional view of one of the servo-units, along line 3—3 of Fig. 2; and Figure 4 is a view at right angles to Figure 3.

Figure 1:
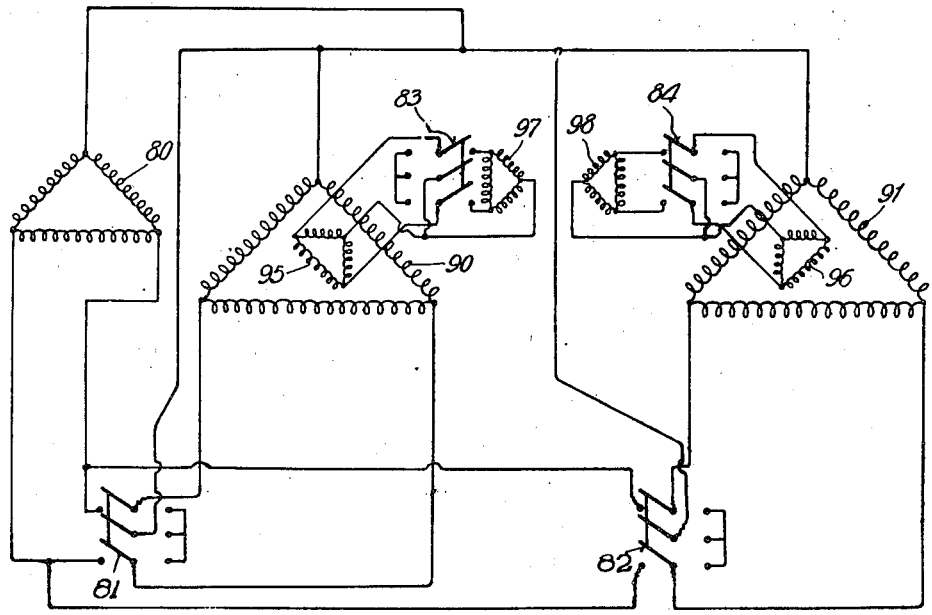
Figure 1 is a schematic diagram of the electrical features of an illustrative form of the improved synchronizing apparatus.

In Figure 1 reference characters 90, 91, 95, and 96 designate the windings of synchronous motors adapted to operate hydraulic servo-units, one of said servo-units—the unit 11—being shown in detail in Figures 2, 3 and 4. The servo-unit to be operated by motor 90, 95 is preferably of identical construction, and each operates to control the adjustment of a governor "speeder spring," such as the governor speeder spring shown at 31 in Figure 2. Such spring opposes the outward movement of governor weights 32, which governor weights in turn may control through a slidable member 9 a hydraulic mechanism for governing the pitch of aircraft propellers in a manner well-known to the art (see Caldwell Patent No. 2,032,255 of February 25, 1936). A suitable form of governor for this purpose is particularly illustrated and described in U. S. Patent No. 2,204,640, granted to E. E. Woodward on June 18, 1940. The pitch controlling mechanisms of the propellers referred to are hydraulically actuated and, as shown in Woodward patent, such governors are arranged to actuate hydraulic valves controlling the supply of hydraulic fluid to the respective propeller pitch changing mechanism and the drainage of the hydraulic fluid from the mechanisms. A suitable form of hydraulic valve for the purpose specified, as particularly illustrated and described in the Woodward patent referred to above, is controlled by the slidable member 9 actuated in one direction by a suitable resilient element such as the "speeder" spring shown at 31 in Figure 2 of the drawings herein, and in the other direction by the action of a governor or centrifugally actuated flyweights such as those shown at 32 and mounted on a rotating head 10 driven by the aircraft engine. Thus the governor is suitably driven in proportion to the engine speed. As the construction and operation of the governors for each of the units is the same, and is particularly illustrated and described in the Woodward patent referred to, it is believed that no further description thereof is required herein; the governors, per se, not being claimed herein.

The novel means for adjusting each governor spring 31, comprises a servo-unit, as above indicated. Each servo-unit (as shown for unit 11 in Figures 2, 3 and 4) includes a piston 41, a valve 42, 43 of the plunger type, a pinion 44 rotatable by the linkage 46, 47 attached to piston rod 48, a rack 49 meshing with pinion 44 and reciprocated thereby, a lever 51 pivotally connected to piston 48 and valve rod 52, and a valve actuating nut 53 having an arm 54 pivotally connecting with lever 51 to actuate the valve 42, 43 when shifted along screw 46 in response to rotation of the latter.

Screw 46 of servo-unit 11 (and the same is true of the corresponding screw of the servo-unit operated by motor 90, 95) is adapted to rotate with motor shaft 103, to effect changes in the speed of the associated engine (by the shifting of the governor 31, 32); such rotation being brought about in part by the electrical interconnection between engine-driven alternators 97 and 98, on the one hand, and the synchronous motors 90, 95 and 91, 96, on the other, as shown in Figure 1. The rotative power is also in part derived from a master unit such as a constant speed alternator having a three-phase winding as indicated at 80 in Figure 1. The amount of rotation of each unit (90, 95 and 91, 96) depends upon the speed difference, as between the master unit, on the one hand, and each engine to be synchronized, on the other.

Should it be desirable, on any special occasion, to accelerate or decelerate a given engine (or engines, less than all) more than the others, this may be accomplished by the operation of certain of the individual control switches shown at 81, 82, 83, 84 which are conveniently mounted within the cabin of the plane for ready operation by the pilot as will be described in detail hereinafter.

Rotation of motor shaft 103 of unit 91, 96 causes a corresponding rotation of the gear train shown at 105, 106, 107, 108 and 109 in Figures 3 and 4. A slip clutch (see 111) may be provided to protect each gear train in the event of any tendency to over-travel (or over-load) of the associated screw-driven nut (see 53) and a spring (see 112) controls the action of each clutch, to prevent premature slipping.

Whenever the screw shaft 46 is rotated by the means above-described—and the same is true of the corresponding screw-shafts for the other servo-unit—the nut 53 acts to swing lever 51 about pivot 50 as a fulcrum, thus drawing valve rod 52 to the right, or pushing it to the left, depending upon the direction of rotation of the screw-shaft. In either event a path is established for fluid flow from accumulator A (Figure 3) to the central annular chamber of valve 42, 43, and from this central annular chamber the fluid passes into the servo-cylinder (by way of passage 61, if the valve has shifted to the left, or by way of passage 62, if the valve has shifted to the right). Piston 41 is thus caused to move in one direction or the other, and in doing so forces fluid to flow from cylinder 60 back to the source S by way of the hollow interior of valve rod 52, which hollow interior feeds the return chamber 63 and the return conduit 64.

Movement of piston 41—and the same is true of the corresponding piston of the other servo-unit—is translated into rotation of pinion 44, and corresponding rectilinear movement of rack 49, to increase or decrease the load on "speeder" spring 31, depending upon the direction of movement of the rack. The effectiveness of fly-weights 32 is correspondingly altered, with a resultant movement of the governor valve (see Woodward patent, above referred to) to vary the pitch of the propeller blades, thus altering the load on the engine which is associated with said propeller blades. Such alteration in load, of course, changes the speed correspondingly.

Moreover it will be seen that I have provided a novel motion amplifying system whereby for every increment of motion of 53, and every position of 53 there is provided an exact change in displacement and change in position of piston rod 48. In other words the mechanism serves as an amplifying device whereby a slight motion or displacement of 53 causes an exact corresponding motion of 48 and 50, but with the addition of sufficient power so that the motion of 48 and 50 can do a given task, such as rotating the gear 44, moving the rack 49 and adjusting the compression of the speeder spring 31. Thus the system disclosed operates to apply a corrective force to the speed controls of each engine to synchronize their speeds. As piston rod 48 is shifted, a follow-up action occurs by reason of the pivotal movement of lever 51 about fulcrum 70. This follow-up action restores valve 42, 43 to neutral.

As previously noted, the winding 80, Figure 1, is the supply circuit of a source of polyphase power which may energize windings 90 and 91 with a predetermined frequency selected by the pilot. Such frequency corresponds to the speed at which the pilot desires to operate his engine at a given time. Under such condition, switch 81 and 82 are manually adjusted so as to close the circuit from the winding 80 to the windings 90 and 91, respectively. Likewise switches 83 and 84 are adjusted so as to close the circuit from the windings 97 and 98 to windings 95 and 96, respectively.

Restricting the description to one engine, it will be seen that with switch 84 being thus closed and alternator 98 being driven by the engine, there will be generated power at a frequency corresponding to the speed of the engine. The circuit is so arranged that this power being fed into the rotor winding 96 will, if of the same frequency as that being received from the source of power 80, result in the magnetic field of 96 rotating at the same frequency and direction as that of 91 with the result that there will be no mechanical force exerted by the windings 91 and 96. However, should the speed of rotation and resultant frequency of 98 be less than that of 80 or than the frequency in 91, then there will be a difference in frequency between 91 and 96 and 96 will tend to lag behind 91, which will cause 96 to revolve physically at such a speed and direction as to make up the difference in frequency between the two windings. It is this physical rotation of 96 that causes shaft 103 of the motor to rotate, moving the gear train 105, 106, 107, 108, shaft 46 and nut 53 so as to cause the valves 42 and 43 to move so as to control the operation of the arm 48 of the piston 41 as previously described. Such action will cause an adjustment increasing the compression of the speeder spring 31, whereupon the control member 9 will be adjusted so as to cause a decrease in the pitch of the propeller so that the speed of the engine will increase. The alternator 98 will then be driven at such a rate of speed as to cause 98 to deliver an increasing frequency, until there is no difference in frequency between 91 and its associated winding 96. At this point the speed of the engine will be exactly corresponding to the speed set up by the master source of supply 80.

On the other hand should the frequency of 98 be higher than that of 80 or the frequency of 91, then 91 will tend to lag behind 96 which will cause the physical rotation of 96 relative to 91 in an opposite direction so as to cause an adjustment decreasing the compression of the speeder spring 31, whereupon the control member 9 will be adjusted so as to cause an increase in the pitch of the propeller so that the speed of the engine will be decreased until synchronism is obtained. In a like manner the other synchronizers operating from windings 97, 95 and 90 cause the engine on which 97 is installed to maintain the proper speed relationship with the master source of supply 80, and since both engines are running at speeds that correspond exactly to that set up by the master source of supply at 80, then both engines must be running at identical speeds in relation to one another.

Should for some reason the pilot wish to cause the engine driving the alternator 98 to operate at an appreciably lower speed than that set up by the master 80, this may be readily accomplished by the pilot manually adjusting the switch 82 so as to disassociate winding 91 from the source of supply 80, and close the opposite terminals for short-circuiting the windings of 91, as indicated diagrammatically at Figure 1. The resulting short-circuiting of the windings 91, together with the continued energization of windings 96 by means of alternator 98 will cause the windings 91, 96, to operate as a wound rotor induction motor whereupon the energization of the winding 91 will lag behind the energization of winding 96 causing a relative mechanical rotation in one direction between 91 and 96. Such action in turn will result in the operation of the servo mechanism by means of shaft 103 and its resulting gear train, so as to cause the governor setting to be changed decreasing the tension of speeder spring 31 for effecting the control member 9 so as to increase the pitch of the propeller and the desired lowering of the speed of the engine. The switch 81 may be likewise adjusted so as to secure similar operation between the windings 95 and 90.

If it is now desired to increase the engine speed above that set up at 80, or in other words, to secure a reversal of rotation of 96 from that direction in which it was rotated in the preceding paragraph, this may be readily accomplished by keeping the switch 82 in the position where the winding 91 is energized by winding 80. Then by a corresponding change of the switching arrangement of 84, the winding 96 may be short-circuited so that the winding 96 will act as a rotor of a wound rotor induction motor. The electromagnetic forces of the windings 91 will impart a reverse rotation to the rotor 96 from that described in the preceding paragraph for decreasing the pitch of the propeller and increasing the engine speed. The switch 83 may be likewise thrown so as to short-circuit the winding 95 so that a similar action can be obtained between 95 and 90. A like effect may, of course, be accomplished by varying the energization of the respective windings in any suitable manner, such as by varying the resistance between the windings 90, 91, 95 or 96 and the respective supply circuits. Moreover when the pitch of a propeller has been adjusted through manual operation of the switches 81-83 or 82-84 to the position desired, the rack 49 may be locked in such adjusted position by the opening of switches 81-83 or 82-84, as shown in Figure 1.

As another application of my invention the control member 9 may actuate a servo valve of the type shown in the said abandoned joint application, Serial No. 416,578 of Donald M. Berges and myself, filed October 25, 1941. Thus the herein control member 9 may control through the servo valve provided therein a servo motor for adjusting the position of an engine throttle to increase or decrease the speed of the engine instead of controlling the pitch of a propeller, as previously described. Moreover the master constant speed alternator may be driven by the master engine, as indicated in the above application, Serial No. 416,578 or the same may be driven by a separate power unit. The control member 9 may similarly be utilized for the adjustment of any other suitable engine control.

Although only several applications of the invention have been illustrated and described, various changes in the form and relative arrangement of the parts, which will now appear to those skilled in the art, may be made without departing from the scope of the invention. Reference is, therefore, to be had to the appended claim for a definition of the limits of the invention.

What is claimed is:

Means for varying the speed of a propeller-driving internal combustion engine, comprising a governor for controlling the speed of said engine, said governor having a speeder spring forming a part thereof, means including a hydraulic servo-motor for varying the loading of said speeder spring, said servo-motor including a hydraulic control valve normally occupying a neutral position, motion translating means for shifting said valve, electrical means for actuating said motion translating means, said motion translating means operably connecting said valve to said servo-motor and said electrical means, said electrical means including a synchronous motor having rotor and stator windings, engine-actuated means for energizing one of said windings, and constant speed means for energizing the other of said windings, and manually operable means located within reach of the pilot of the craft when the latter is in flight for alternately rendering the energization of one or the other of said windings ineffective, whereby the speed of said controlled engine may be independently regulated by the pilot.

CHARLES I. MacNEIL.

REFERENCES CITED

The following references are of record in the file of this patent:

UNITED STATES PATENTS

| Number | Name | Date |
|---|---|---|
| 689,186 | Heisler | Dec. 17, 1901 |
| 819,028 | Stanley | Apr. 24, 1906 |
| 871,513 | Lohr | Nov. 19, 1907 |
| 1,570,505 | Laughlin | Jan. 19, 1926 |
| 1,671,463 | Boddie | May 29, 1928 |
| 1,839,915 | Chorlton | Jan. 5, 1932 |
| 1,853,613 | Herr | Apr. 12, 1932 |
| 1,941,500 | Simmen | Jan. 2, 1934 |
| 1,976,820 | Wettstein | Oct. 16, 1934 |
| 1,977,980 | Artsay | Oct. 23, 1934 |
| 2,098,761 | Schläpfer | Nov. 9, 1937 |
| 2,144,429 | Martin | Jan. 17, 1939 |
| 2,205,265 | Kalin | June 18, 1940 |
| 2,217,856 | Brady | Oct. 15, 1940 |
| 2,252,518 | Martin | Aug. 12, 1941 |
| 2,260,469 | Martin | Oct. 28, 1941 |
| 2,261,145 | Dickey | Nov. 4, 1941 |
| 2,302,042 | Martin | Nov. 17, 1942 |
| 2,319,218 | Drake | May 18, 1943 |
| 2,332,925 | Martin | Oct. 26, 1943 |
| 2,374,276 | French | Apr. 24, 1945 |